3,773,837
PROCESS FOR PRODUCING BENZYL KETONES
James W. Sprague, Bedford, and Ronald J. Valus, Cleveland, Ohio, assignors to The Standard Oil Company, Cleveland, Ohio
No Drawing. Filed Sept. 21, 1970, Ser. No. 74,186
Int. Cl. C07c 49/76
U.S. Cl. 260—590                                    5 Claims

ABSTRACT OF THE DISCLOSURE

Benzyl ketones are produced in a one-step process by reacting benzene with a ketone at elevated temperatures in the presence of divalent palladium salt of a carboxylic acid and a strongly acidic catalyst.

PROCESS FOR PRODUCING BENZYL KETONES

This invention relates to a novel process for preparing benzyl ketones and more particularly to a process for preparing benzyl ketones represented by the formula:

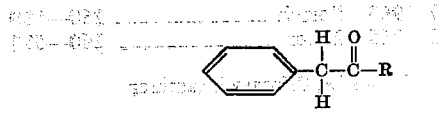

wherein R may be a hydrocarbon group containing from about 1 to 10 carbon atoms. The process involves the condensation reaction of benzene and a ketone wherein the ketone has at least one methyl group as in the formula:

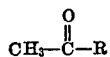

and where R has the same designation as above. The reaction is carried out in the presence of an oxidizing agent comprising a divalent palladium salt and a strongly acidic catalyst.

Heretofore benzyl ketones of the above type have been prepared by various procedures involving a number of steps, such as for example as disclosed in the French Patent 1,457,540, Nov. 4, 1966 issued to A. Rocca; whereby an arylmagnesium halide is reacted with allyl chloride, followed by double bond isomerization, peroxide oxidation to a diol and conversion of the diol to the desired ketone by acid catalysis. In another process reporated by D. Ivanov et al., (Rev. Chim., Acad Rep. Propulaire Roumaine 7 (2) 985–92 1962); sodium phenyl acetate is reacted with an alkyl magnesium halide followed by reaction with an ester. In still another process reported by D. R. Coulson, (Tetrahedron Letters 1964, 45–46, 3323-6) phenylphosphine is reacted with methyl α-chloroethyl ether, and the phosphonium salt thus obtained is further reacted with an aldehyde or a ketone. However, preparation of these compounds by a simple one-step condensation reaction as described in this invention has not been disclosed.

The benzyl ketones prepared according to the procedure of this invention are of interest as organic intermediates, particularly as intermediates in the production of amides from which isocyanates can be produced that cannot be produced by the usual methods of manufacture.

In accordance with the present invention benzene and a ketone as defined hereinabove are reacted in the presence of a divalent palladium salt of a carboxylic acid, such as for example, acetic acid, propionic acid, naphthenic acid, malonic acid, succinic acid, glutraic acid, adipic acid, etc. Because of economic considerations palladium acetate is most preferred.

The strongly acidic catalyst useful in this process must be a sufficiently strong acid to displace the carboxylic anion from the divalent palladium salt, and suitable strong acids include trifluoroacetic acid, perchloric acid, sulfuric acid, or a sulfonic acid such as p-toluene sulfonic acid.

In this process the reactants themselves are usually miscible, and this reaction may be carried out in the absence of a solvent or other reaction media with only the particular combination of reactants necessary to give the desired product being present, as for example, mixtures of benzene with acetone, acetophenone, methyl ethyl ketone, or 2-decanone. The reaction mixture, however, may also contain a solvent such as acetic acid, acetonitrile, glyme or ethyl ether. Preferably the reaction is carried out in the presence of a benzene-rich reaction medium.

The reaction is usually carried out under atmospheric pressure at a temperature in the range of from about 50° C. to 150° C., the reaction temperature being most often dictated by the reflux temperatures of the solvent system employed. Reactions carried out below 50° C. usually result in a maximum yield of only about 50 percent of the benzyl ketone, probably because the palladium salt is reduced to the monovalent state rather than to the palladium metal under these conditions. Reactions carried out above about 150° C. are usually adversely affected by decomposition of the palladium acetate.

The concentration of the palladium carboxylic acid salt in the reaction mixture has an important effect on yield of the benzyl ketone while the concentration of the acid catalyst has only a minor effect on yield. Palladium concentrations in the range of 0.01 to 0.2 moles of palladium salt per liter of reaction mixture are operable, however, concentrations in the range of 0.025 to 0.125 moles of palladium per liter of mixture are preferred. Indications are that higher yields are obtained with lower concentrations of the oxidizing agent. Preferably the strong acid catalyst may be employed in the concentration range of 1 to 10 moles of acid per mole of palladium carboxylic acid salt, although higher concentrations are operable.

The preferred mode of carrying out the process of this invention comprises preparing a solution of the desired palladium carboxylic salt, preferably palladium acetate, in a reaction medium such as a mixture of benzene and acetone and containing predominantly benzene on a molar basis. A strong acid catalyst such as trifluoroacetic acid is added to the reaction mixture, and with gentle stirring the mixture is brought to reflux temperature and is maintained at this temperature for a period of about 15 to 30 hours. On completion of the reaction, the palladium salt is recovered from the reaction mixture by filtering and washing the palladium metal precipitate with additional solvent, and subsequently converting the palladium metal to palladium acetate for reuse. The benzyl ketone may be recovered from the remaining reaction mixture by distillation. The process of this invention readily lends itself to a continuous process by regenerating the divalent palladium salt in situ by bubbling air or oxygen through the reaction mixture.

The above procedure was followed in carrying out the experiments reported in Table I, and the reaction products were analyzed by gas chromatography in a column 10 feet high, ¼ inch in diameter containing SE-30 on Chromosorb G at 190° C. In addition to acetonyl benzene smaller amounts of other products such as biphenyl and phenyl acetate were identified in the reaction product. The product yields reported in the table represent the mole percent of product obtained based on the moles of palladium acetate employed.

TABLE I.—PALLADIUM CATALYSED CONDENSATION OF BENZENE AND ACETONE

| Solvent system (component/mole fraction) | Solvent volume (ml.) | Catalyst | Catalyst/Pd II,[1] (mole ratio) | (Pd II) (moles/liter) | Temp. (° C.) | Reaction time (hrs.) | Products (percent) | | | Pd ppt. |
| --- | --- | --- | --- | --- | --- | --- | --- | --- | --- | --- |
| | | | | | | | $C_6H_5CH_2COCH_3$ | Diphenyl | Phenyl acetate | |
| $C_6H_6$ (.78)/$Me_2CO$ (.22) | 200 | $CF_3CO_2H$ | 5 | .05 | Reflux | 18 | 21 | 10 | 2 | 1.19 |
| | 100 | $CF_3CO_2H$ | 3.5 | .10 | do | 17 | 11 | 9 | .8 | .96 |
| | 100 | $CF_3CO_2H$ | 5 | .10 | do | 16 | 11 | 10 | .8 | 1.01 |
| | 200 | $CF_3CO_2H$ | 10 | .025 | do | 64 | 17 | Trace | Trace | .53 |

[1] $Pd(OAc)_2$.

We claim:

1. A process for preparing benzyl ketones having the formula:

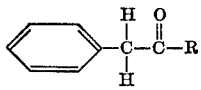

wherein R is an alkyl or an aromatic hydrocarbon group containing form about 1 to 10 carbon atoms, comprising reacting benzene and a ketone having the formula:

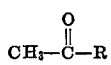

wherein R has the same designation as above, at a temperature within the range of about 50° to 150° C. in the presence of a mixture of:

(A) an acid catalyst selected from the group consisting of trifluoroacetic acid, perchloric acid, sulfuric acid and an aromatic sulfonic acid, and (B) from about 0.1 to 0.2 moles per liter of reactant mixture of a divalent palladium salt of a carboxylic acid, said carboxylic acid being selected from the group consisting of acetic, propionic, naphthenic, malonic, succinic, glutaric and adipic acids, and recovering the benzyl ketone therefrom.

2. The process of claim 1 wherein the reaction mixture contains benzene in excess of the stoichiometric requirements for reaction with the ketone.

We claim:

3. The process of claim 2 wherein the divalent palladium salt is palladium acetate.

4. The process of claim 3 wherein the catalyst is trifluoroacetic acid.

5. The process of claim 2 wherein the acid catalyst is employed in amounts of from about 1 to 10 moles of catalyst per mole of palladium salt.

References Cited

UNITED STATES PATENTS 3,098,874  7/1963  Porsch ............... 260—590
3,226,443  12/1965  Meier ............... 260—590

DANIELD D. HORWITZ, Primary Examiner